(No Model.) 4 Sheets—Sheet 1.

J. A. PRICE.
HEATING STOVE.

No. 381,026. Patented Apr. 10, 1888.

WITNESSES.
Chas. R. Burr.
A. J. Stewart.

INVENTOR.
John A. Price,
By Church & Church
his Attorneys.

(No Model.) 4 Sheets—Sheet 2.

J. A. PRICE.
HEATING STOVE.

No. 381,026. Patented Apr. 10, 1888.

Witnesses.
Chas. R. Burt.
A. J. Stewart.

Inventor
John A. Price
by Church & Church
his Attorneys.

N. PETERS, Photo-Lithographer, Washington, D. C.

(No Model.) 4 Sheets—Sheet 3.
J. A. PRICE.
HEATING STOVE.
No. 381,026. Patented Apr. 10, 1888.
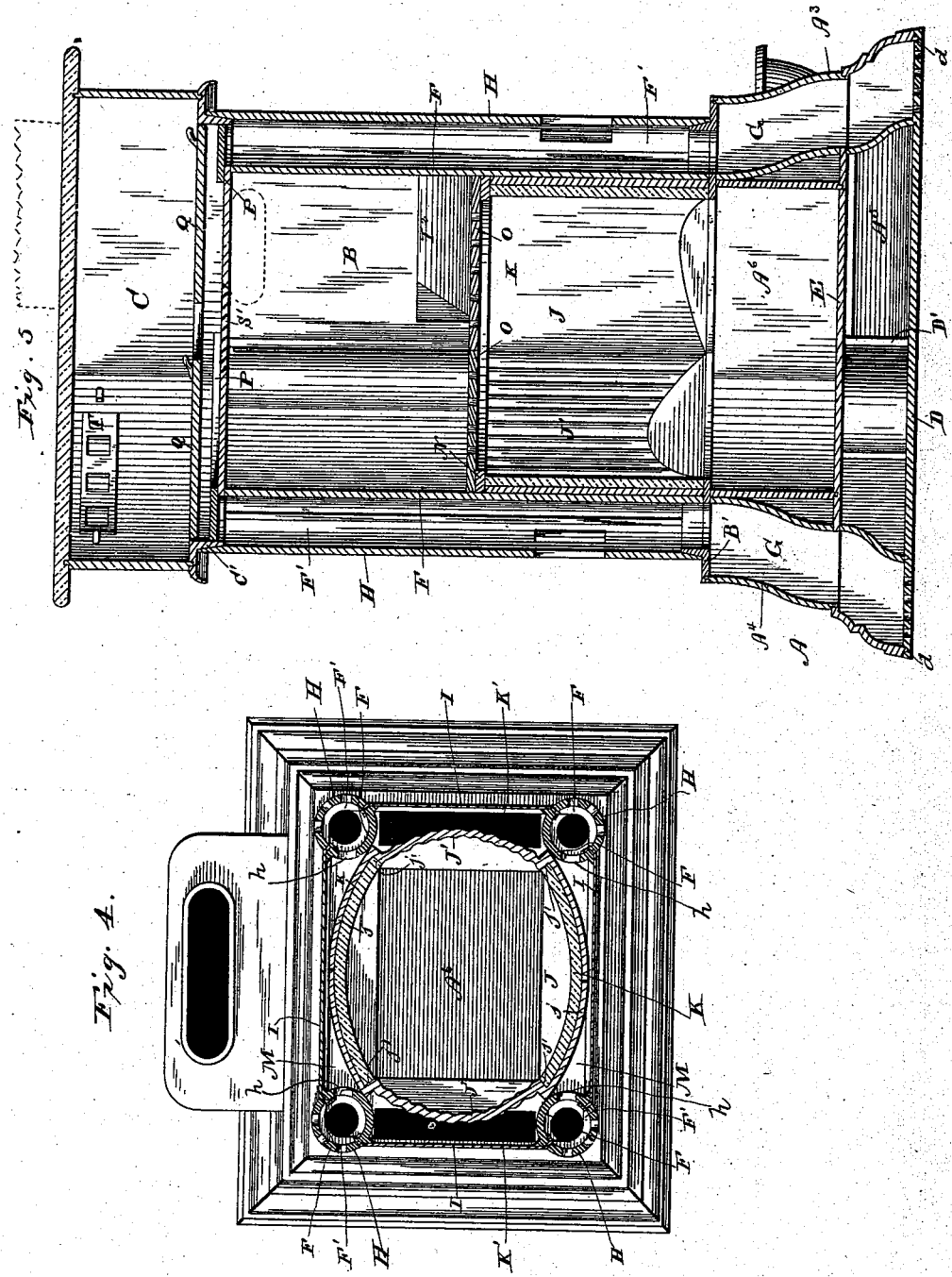
Witnesses.
Chas. R. Burr.
A. F. Stewart.
Inventor.
John A. Price,
by Church & Church,
his Attorneys.

(No Model.) 4 Sheets—Sheet 4.
J. A. PRICE.
HEATING STOVE.
No. 381,026. Patented Apr. 10, 1888.
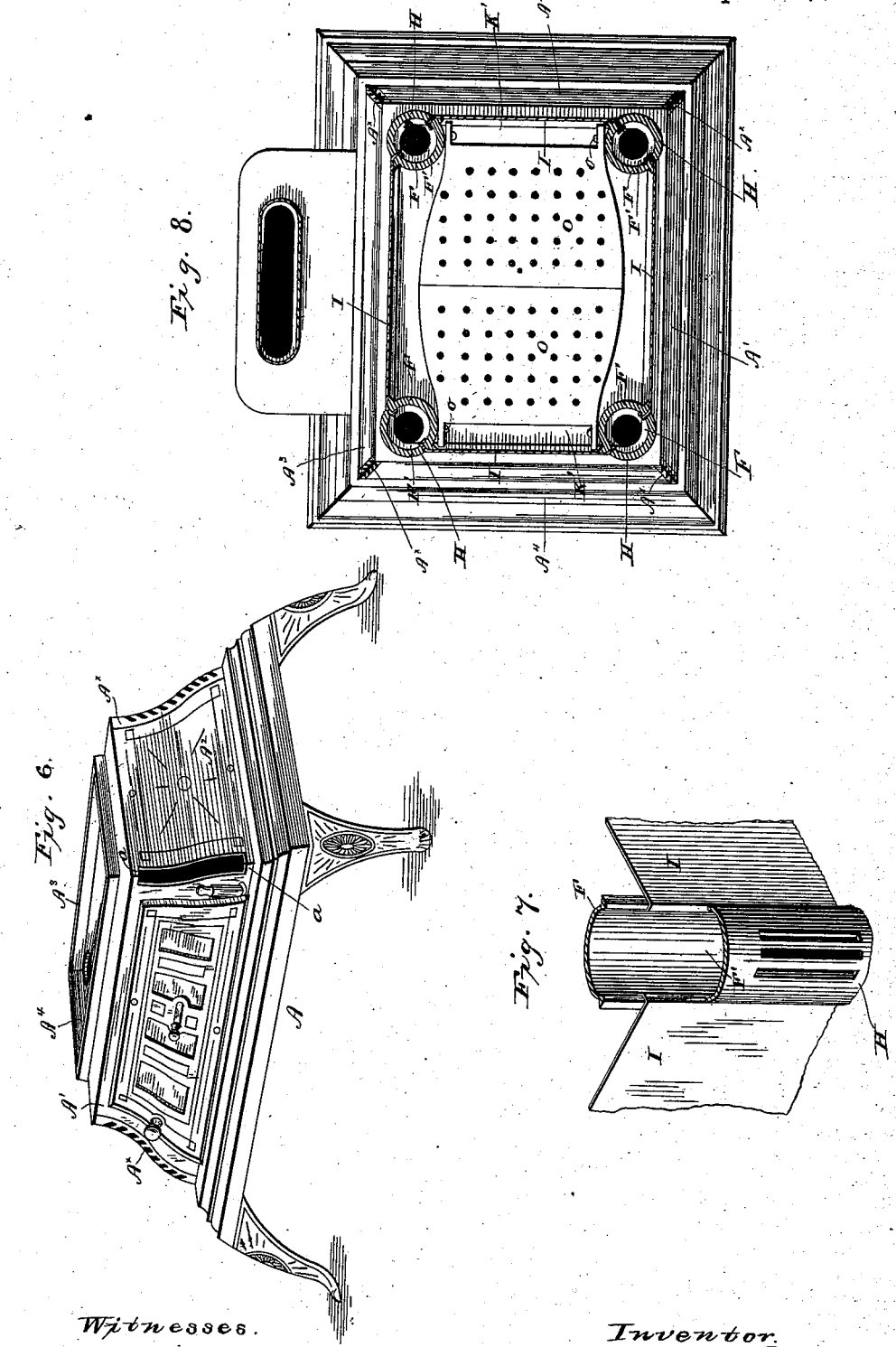
Witnesses.
Chas. R. Burt.
A. J. Stewart.
Inventor.
John A. Price
by Church & Church
his Attorneys.

UNITED STATES PATENT OFFICE.

JOHN A. PRICE, OF SCRANTON, PENNSYLVANIA.

HEATING-STOVE.

SPECIFICATION forming part of Letters Patent No. 381,026, dated April 10, 1888.

Application filed February 10, 1887. Serial No. 227,155. (No model.)

*To all whom it may concern:*

Be it known that I, JOHN A. PRICE, of Scranton, in the county of Lackawanna and State of Pennsylvania, have invented certain new and usful Improvements in Heating-Stoves; and I do hereby declare the following to be a full, clear, and exact description of the same, reference being had to the accompanying drawings, forming a part of this specification, and to the figures and letters of reference marked thereon.

My invention has for its object to improve the construction of that class of heating-stoves known as "revertible flue," wherein the smoke and products of combustion are arranged to pass from the fire-pot down and through the base of the stove, and then upward to the chimney or exit-flue, whereby they pass over a large surface exposed to the air, thus increasing the heating capacity of the stove; and the invention consists, generally, in devices for not only increasing the surface exposed to the air directly with which the smoke and products come in contact, but also in providing flues and chambers located in the body of the stove, through which the air passes, that are heated in a more thorough and economical manner than heretofore, and a circulation of heated air is produced in the room, heating the latter in a more thorough manner, and also adapting the same construction to applying heat to adjoining apartments, when desired.

It further consists in certain novelties of construction that render the stove capable of being used as a heating and cooking or warming stove, when desired, and in certain novel combinations of parts, all of which will be fully described, and pointed out particularly in the claims at the end of this specification.

Figure 1:
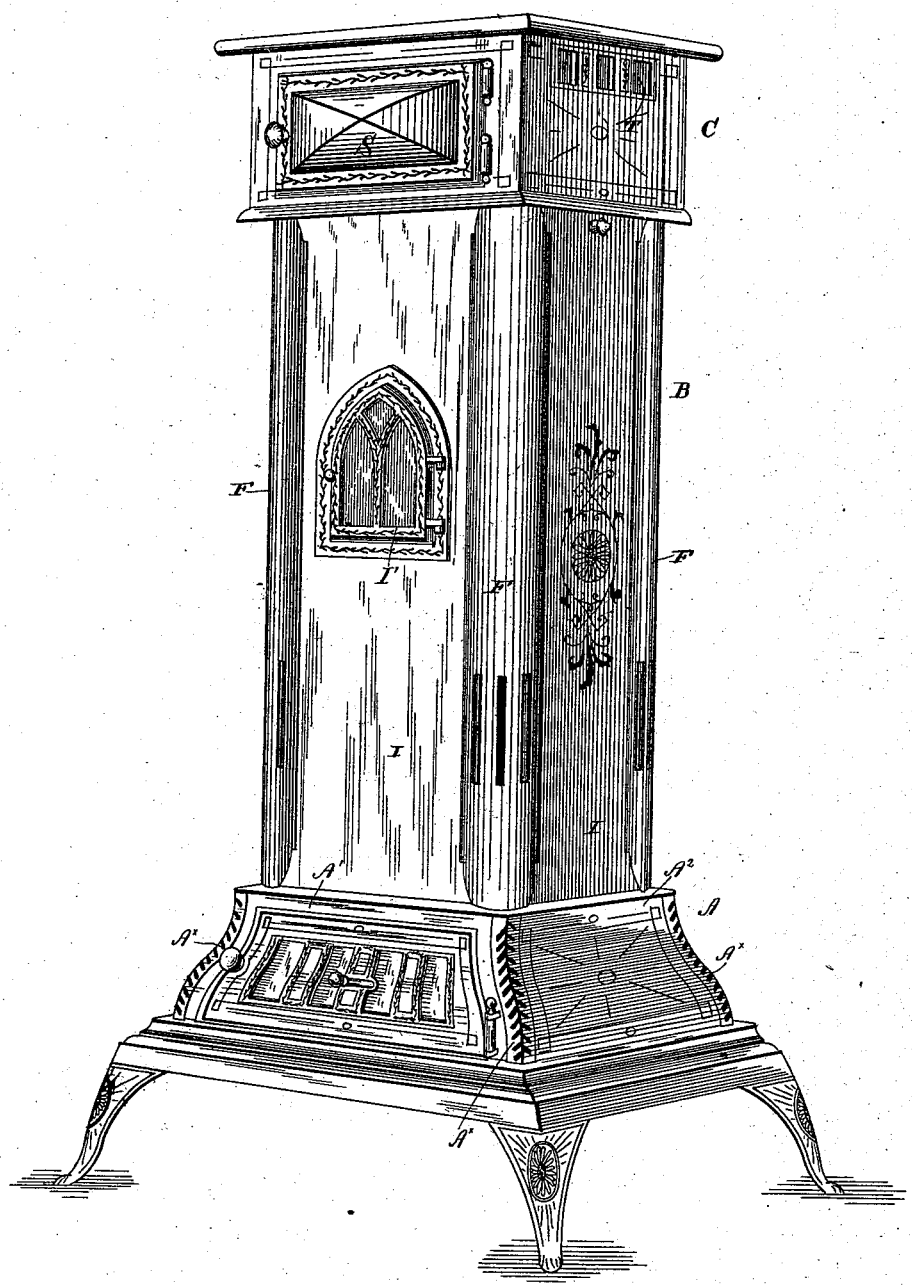
Figure 3:
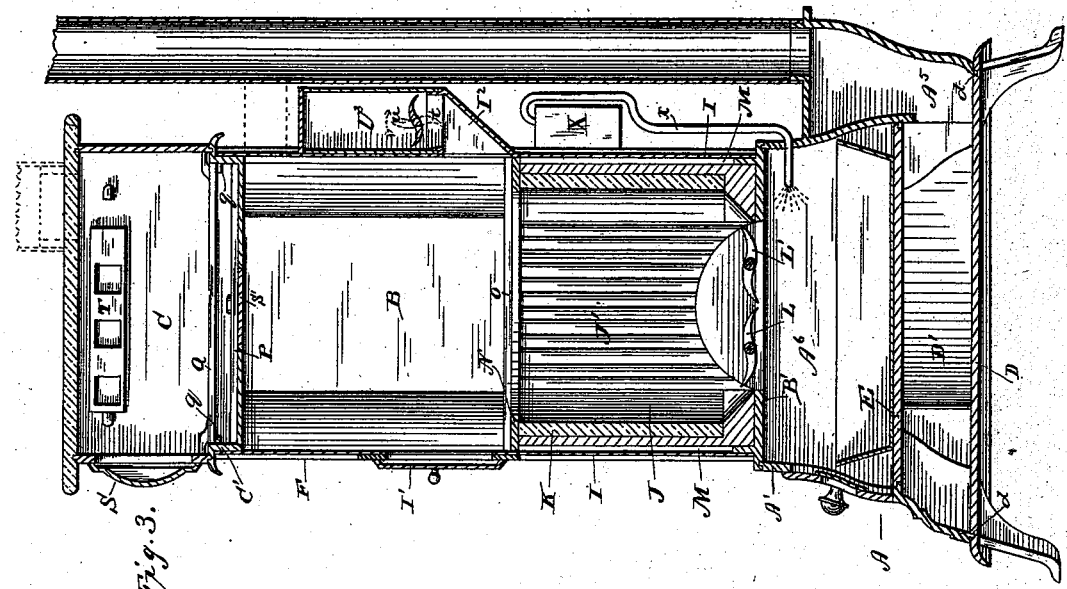
Figure 2:
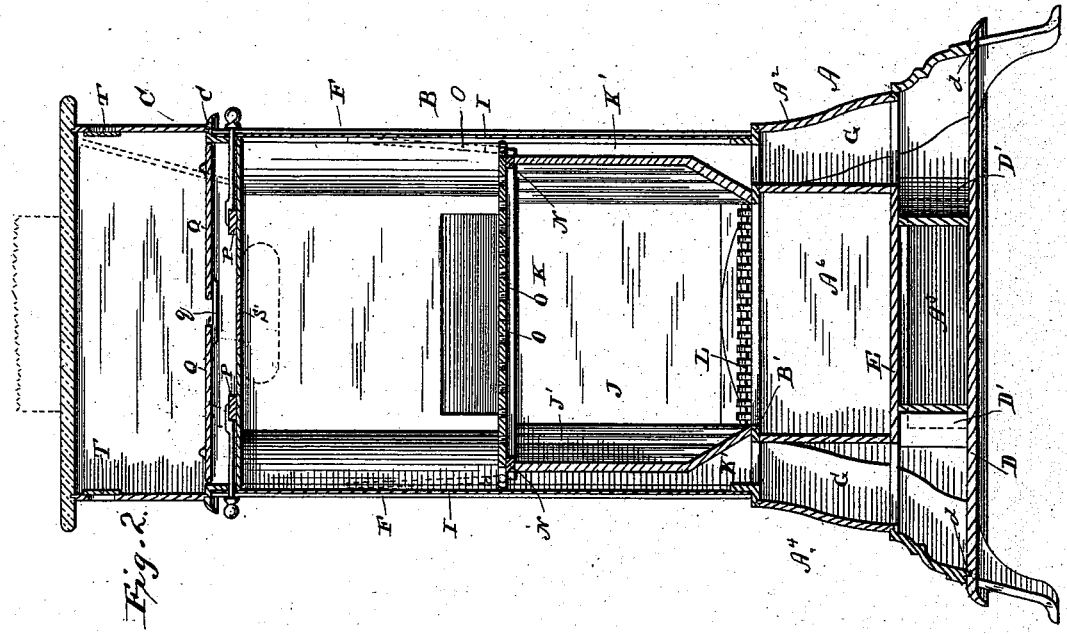

In the accompanying drawings, Figure 1 is a perspective view of a stove constructed in accordance with my invention. Fig. 2 is a vertical section looking from the front; Fig. 3, a vertical section looking from one side; Fig. 4, a cross sectional view through the fire-pot; Fig. 5, a vertical sectional view taken diagonally through the opposite corners; Fig. 6, a perspective view showing the construction of the base of the stove; Fig. 7, a detailed perspective view showing the manner of fastening the sides of the stove in place; Fig. 8, a view of the top of the fire-pot, showing the manner of mounting the doors adapted to be placed over the fire.

Similar letters of reference in the several figures indicate the same parts.

The stove consists, generally, of three portions—the base A, the body portion B, containing the fire-pot and most of the flues, and the upper portion, C, consisting of the reservoir or hot-air chamber, adapted also at certain times to be utilized, if desired, as an oven for cooking. These parts I shall proceed to describe in the order noted above.

The base A is constructed, as shown clearly in Fig. 6, preferably of four plates, $A'$ $A^2$ $A^3$ $A^4$, of ogee or reverse curved form, and are provided on their upper ends with flanges adapted to co operate with any suitable form of top plate. Their ends are, however, provided with two or more, if desired, projections or strips, $a$, that serve as means for securing them together by means of bolts or screws in the ordinary or any preferred manner, thus leaving the extreme corners of the base-frame open, as shown, and these corners are adapted to be covered by means of plates $A^x$, having slots or perforations therein, as shown, and secured in place in any suitable manner.

The base-plate D of the stove may be provided with a groove, $d$, with which suitable flanges on the lower sides of the plates forming the base co-operate to form a tight joint, and it is further provided upon its upper side with the wings or deflectors $D'$ $D'$, flared toward the rear, as shown, serving to direct the smoke and products of combustion toward the exit-flue $A^5$, preferably formed upon the rear plate of the base, with which the vertical exit-flue communicates. The top of the base, which constitutes the lower plate of the middle portion, B, consists of a casting, $B'$, provided on its lower side with a groove, into which the upper sides of the plates $A'$ $A^2$, &c., project, or a suitable tight joint may be made between the parts in any manner.

The ash-pit $A^6$ is formed in the base by the partition E and side pieces, as shown, a suitable door being provided to permit access thereto, as will be readily understood.

The body portion B consists, as far as external appearances are concerned, of the standards F, located at the corners, secured to the casting $B'$, and provided with the grooves or channels F' in their outer sides, which form continuations of passages G, located in the base and passing up through the chamber therein, but not communicating therewith. The sides of these standards are preferably beveled, as shown, and the plates H preferably grooved and provided with flanges at the edges corresponding with the sides of the standards. The plates H are to be secured in position upon the standards in any suitable manner, and between the two are placed the bent edges of plates or panels I, forming the sides of the stove. These are preferably of sheet metal and formed on their upper and lower edges so as to make a tight joint with the casting B', and with the casting C' forming the bottom of the portion C. It will readily be seen that these sides can be readily removed when necessary or desirable and be replaced again; or panels having any desired ornamentation may be substituted. The panel at the front of the stove is provided with a suitable door, I', if desired, for affording access to the interior, and the one at rear is provided with a short hopper, I², having an inclined bottom projecting inward about in line with the top of the fire-pot, as will be presently explained, and it may be further provided with a perforation, to which may be attached a pipe communicating with the chimney and forming a direct draft-flue, as indicated in dotted lines.

J represents the fire-pot of the stove, located within the portion B and secured to the casting B' or the standards, or in any other suitable manner; and it consists, preferably, of two sections of metal shaped as shown in Fig. 4—that is, with the corrugated portions J' near the middle of each one and the recesses j near the ends having the undercut shoulders j'. The ends extend beyond the shoulders and approach very near together, or touch, if desired, while pieces of fire-brick or refractory material, K, are inserted in the space between the shoulders j', the undercut portions forming a dovetail recess which the ends of the back fit into, and perform not only the function of holding the sections J' J' together, but also cover the joint between them.

While the fire-pot, as shown, is composed of only two sections, it is obvious that any number could be employed, a corresponding number of fire-bricks being used also. The corrugated metal portions, being in contact with the fire, will of course serve to radiate heat, and in the present instance are located at the ends of the stove and form one side of the diving-flues K', through which the products from the fire pass downward to the chamber in the base of the stove, and from thence to the exit-flue, a suitable perforation being made in the casting B' for the purpose. The object in thus heating the flue through which the products pass will readily be apparent, as it permits a much better draft to be maintained at all times.

In the lower end of the fire-pot is provided a grate, preferably composed of two removable sections, L L, of ogee form, geared together, so as to rotate simultaneously and to positively withdraw the ashes from the lower side of the fire, although any other preferred form of grate may be employed, if desired.

At the front and rear of the stove are formed chambers M M, between the panels I I and the outer side of the fire-pot, the upper side being formed by a plate, N, located upon the top of the fire-pot and serving to prevent injury thereto, the bottom of the chamber being formed by the casting B', as shown, and the vertical ducts or flues, formed by the channeled standards and plates H, communicate with this chamber through the slots or openings h therein, as shown in Fig. 4. These chambers, it will be observed, receive heat directly from the side of the fire-pot, which is preferably prevented from burning through at these points by the interposed section of refractory material.

In order to stimulate the fire somewhat when desired, but more particularly to be employed in connection with devices about to be described, I provide a water-receptacle, X, located either partly within or without the stove-casing and adapted to be heated to generate steam, and provide a pipe, x, leading from this chamber to the ash-pit of the stove, so as to discharge steam therein. The chamber may be provided with a removable top, so as to be readily filled when desired.

O O represent two doors or plates of refractory material—such as fire-brick—pivoted to the standards on the outside of the diving-flues and adapted (when desired to keep the fire by retarding combustion) to be turned over upon the bed of fuel, acting as a cover therefor, and they may be provided with a few small perforations to allow of the escape of gas, if desired. These plates are located a sufficient distance from the pivots of the rods or supports o o, on which they are mounted, so that the passage K' will not be obstructed, but will permit the gas to escape when they are turned down over the fire, their normal position being turned up against the sides of the stove, as shown in dotted lines in Fig. 2, and in full lines in said figure their position is indicated when they are turned down. Suitable devices may be provided for causing these motions of the plates, such as providing them with a squared journal at one end and a handle for co-operating therewith. Of course the plates can be employed as deflectors merely for not only retarding in a great measure the combustion by covering the fire, but by deflecting the currents in the most advantageous manner, being rendered adjustable and secured by any suitable locking mechanism. The utility of these plates for retarding the combustion I have demonstrated by practical experiment, and have by their use succeeded in preserving a slight fire for more than twenty-four hours with a very slight diminution or consumption of fuel.

Supported upon the standards F is the chamber C, consisting of the plates having the flanges at the ends secured together and to the lower plate, C', the upper side being formed by a slab or piece of marble or slate secured in position in any suitable manner, the material being selected for the reason that it will not conduct or radiate heat as a metal top would, and will also serve as an ornamental and durable top for the stove. If desired, an ornamental railing or grating of brass or other material may be placed upon the top of the slab. The lower side of the chamber is provided with perforations communicating with the hollow standards F, and connection between the standards and chamber may be shut off, when desired, by means of the sliding dampers P P, located on opposite sides of the chamber, and each consisting of the two broad portions connected by a rod or connecting-piece, and adapted to be operated by a rod projecting to the outside of the casing. Pivoted to each side of the chamber, near the bottom thereof, are plates Q, adapted to be swung down to the position shown in full lines, Fig. 2, or up into the position shown in dotted lines, by suitable operating apparatus projecting to the outside of the chamber, as a handle, for instance. These plates, when swung down into their lower position, do not quite meet, and are supported above the bottom of the chamber by lugs $q\ q$, secured on opposite sides, as shown, and serve as a supplemental bottom for said chamber, and also as a device for retarding and diverting the currents of hot air coming up the hollow standards F if the sliding dampers P are open. When the plates are in their swung-up position, as shown in dotted lines, the currents of hot air from the base are permitted to pass directly out of the perforations in the sides, farther on described, forming continuations of the vertical flues. This chamber may be employed as an oven, when desired, a suitable door, S, being provided in the front, as shown, for permitting access to the interior; or it may also be used as a receptacle for cooking with a more intense heat, a suitable pot-hole, S', being provided in its lower side covered by a suitable top, as shown, and the chamber being directly over the fire of course receives a great deal of direct heat beside what is admitted to it through the passages F' in the standards from the chambers at the side of the fire-pot and the passages which communicate with the air at their lower ends in the base-plate of the stove.

Suitable registers, T, are placed in the sides of the chamber C for opening communication with the external air and permitting the heat to enter the room; and, if desired, suitable pipes or conduits might be connected with the chamber leading to various remote points, as indicated in dotted lines, which would be a very desirable feature, as the amount of hot air conducted to and in this chamber is, by reason of the improved construction of devices, considerable.

As it is desirable to have as much and as bright a fire-surface as possible, particularly in parlor-stoves, I locate the reservoir of the stove to one side and provide means for positively feeding fuel to the surface of the fire, at the same time leaving the space between the fire and the hot-air chamber or reservoir open, so as to permit the latter to receive the maximum amount of heat for heating or cooking.

The short hopper at the rear and upper side of the fire-pot is provided with a flange, $t$, on its upper side, and with the flange is adapted to co-operate the lower end of the removable reservoir U, provided with a cover, and having in its lower end one or more sections, $u$, preferably of ogee or reverse curved form, adapted, when in horizontal position, to form a bottom for the chamber, and when turned in the direction indicated by the dotted arrow to positively withdraw a portion of the fuel and deposit it in the hopper, from whence it will fall upon the bed of fuel in the fire-pot. At every half-revolution of this section a similar charge will be withdrawn, and when the reservoir is empty it can be removed and another or the same one replaced thereon, a suitable cover or top being provided adapted to fit over the end of the hopper while the reservoir is being filled. While the reservoir is being carried from place to place, the section $u$ will serve as a bottom and prevent the fuel falling out, and when it is placed upon the hopper suitable fastening devices may be employed for holding it in position, as will be readily understood.

The construction having been described, the operation of the device will now be apparent.

The products of combustion pass from the bed of fuel, over the sides of the fire-pot, down the diving-flues K', the sides of which are formed by the fire-pot, and are heated therefrom, and also heating the sides of the passages F' in the standards and inducing a draft of air up through them, as described. The products then pass into the chamber at the base, and after circulating therein are deflected toward the rear and pass thence through the exit-flue to the chimney. The lower ends of the ducts F', being open below the stove, conduct air up through them, which circulates in the chambers at the side of the fire-pot, being first heated by contact with the chamber in the base and by contact with the sides of the diving-flues. The openings in plate D in the base also admit air to the ducts or flues, and also those provided in the plates H, as shown, and all then passes up through the flues to the chamber C, where it is directed and deflected, as described, and discharged into the room or conveyed to other apartments, as desired. When the dampers at the upper ends of flues F' are closed, the hot air not finding an entrance to the chamber will pass out of the openings in the ducts into the room, and the same will be the case when the exit from the chamber C is entirely closed, the air then passing down out through the openings in the sides of the ducts, which may be provided at various places in the length, as will be readily understood.

I do not desire to be confined to the precise construction of devices herein described and shown, as others their equivalents might be employed without departing from the spirit of my invention.

I claim—

1. The combination, with the base and the vertical standards mounted thereon, of the metal panels forming the sides and back and the corner-pieces recessed, as shown, secured to the standards, and operating to secure the panels in position by clamping their edges, and also serving as upright flues for the passage of air, substantially as described.

2. The combination, with the base and the vertical standards having the channels, the flanges at the sides of the channels, and the metal panels forming the inclosing-casing of the stove, of the removable corner-pieces having the channels therein adapted to be secured over the corner channels and co-operating with the flanges at the sides of the same to clamp the edges of the casing-panels, substantially as described.

3. The combination, with the base, the grooved vertical standards, and the metal panels, of the grooved pieces forming with the grooved standards vertical hot-air flues and operating when placed in position to secure the edges of the panels between the pieces and the edges of the channels in the standards, substantially as described.

4. The combination, with the fire-pot, of the two diving-flues on opposite sides thereof, the chambers formed on the other two sides of the fire-pot not connected with the diving-flues, and the vertical hot-air tubes extending through the chambers and communicating with them, substantially as described.

5. The combination, with the fire-pot, of the two diving-flues on opposite sides thereof, the two chambers formed on opposite sides of the fire-pot between the diving-flues, but not connected with the latter, and the vertical hot-air flues connected with said chambers, one of the walls of each being exposed to the heat of products in the diving-flues, substantially as described.

6. The combination, with the stove-base having the chamber therein connected with the exit-flue and the fire-pot located above said base, of the two diving-flues on opposite sides the fire-pot connected with said chamber, the two chambers formed at the sides of the fire-pot between the two diving-flues, but not connected therewith, and the vertical hot-air flues communicating with said chamber and with the external air, substantially as described.

7. The combination, with the fire-pot and the diving-flues at the sides thereof, of the chambers also at the sides of the fire-pot, but not connected therewith, and the vertical hot-air flues communicating with said chambers, the external air, and with a hot-air chamber at the top of the stove, substantially as described.

8. The combination, with the fire-pot having the metal portions, and the diving-flues formed in part by said metal portion, of the chamber formed at the sides of the fire-pot with an interposed section of fire-brick between it and the fire, and the vertical heat-flues communicating with said chamber and with the external air, substantially as described.

9. The combination, with the fire-pot constructed in sections, each having the recesses in its ends, of the sections of fire-brick inserted in said recesses and covering the joint between the sections, substantially as described.

10. The combination, with the fire-pot constructed in sections, having the recesses in their ends undercut, as shown, and the sections of fire-brick having the ends adapted to fit the recesses, whereby the sections of the fire-pot will be held together and the joints between them covered, substantially as described.

11. The combination, with the fire-pot made in sections, having the recesses at the adjoining ends, of the fire-bricks, said bricks and sections having interlocking projections and recesses, whereby the former will hold the sections together and cover the joints between them, substantially as described.

12. The combination, with the fire-pot made in sections, each consisting of a corrugated portion exposed to the fire and having at the ends recesses, of the fire-bricks, the recesses and bricks having interlocking projections and recesses, whereby the sections will be held together by the bricks and the joints between the sections covered by the latter, substantially as described.

13. The combination, with the hot-air chamber located above the fire-pot, of the vertical flues communicating therewith and the hinged doors adapted to be folded down to form a supplemental bottom or to be folded up against the sides of the chamber, substantially as described.

14. The combination, with the hot-air chamber located above the fire-pot, having the openings in its side communicating with the external air, of the hinged doors located therein, adapted to be folded down to form a supplemental bottom for the chamber and when turned up against the sides of the chamber forming continuations of the vertical flues, substantially as described.

15. The combination, with the hot-air chamber and the hot-air flues communicating therewith, of the hinged doors located within the chamber, adapted, when folded down, to leave a small space between them and operate as retarding devices for the hot air passing up the flues and adapted to fold up against the sides of the chamber to form continuations of the vertical flues, substantially as described.

16. The combination, with the fire-pot, and the plate or plates pivoted at the sides and adapted to be folded over upon the top thereof for arresting active combustion, of the water-receptacle placed in proximity to the fire-pot and adapted to be heated therefrom, and having a steam-pipe leading to the ash-pit below the grate, substantially as described.

17. The combination, with the fire-pot, of the removable fuel-reservoir mounted on one side the fire-pot, having the reverse curved section located in its lower end capable of being rotated and serving as a bottom for the reservoir when removed and as a means of withdrawing the fuel and depositing it in the fire-pot when in position on the stove, substantially as described.

18. The combination, with the fire-pot and the diving-flues at the sides thereof, of doors or plates pivoted at the sides of the diving-flues and adapted to be folded over upon the fuel in the fire-pot to retard or arrest combustion without obstructing the diving-flues, substantially as described.

19. In a stove, the combination, with vertical flues, of the base consisting of the side and end pieces having the projections at the ends adapted to be secured to each other, substantially as described, of the perforated cap or corner plates secured over said projections and forming the outer side of the flues, as set forth.

JOHN A. PRICE.

Witnesses:
FRED T. CHURCH,
MELVILLE CHURCH.